United States Patent Office 2,923,648
Patented Feb. 2, 1960

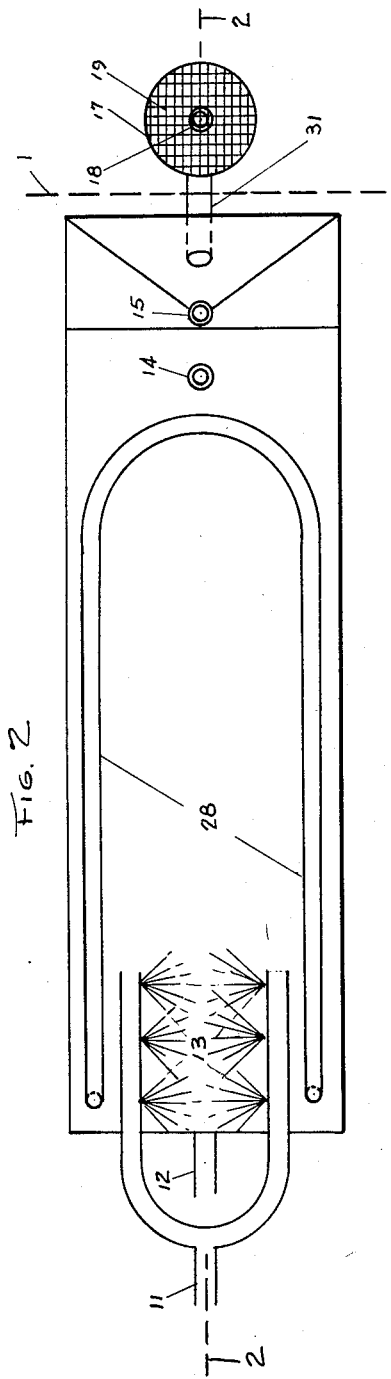
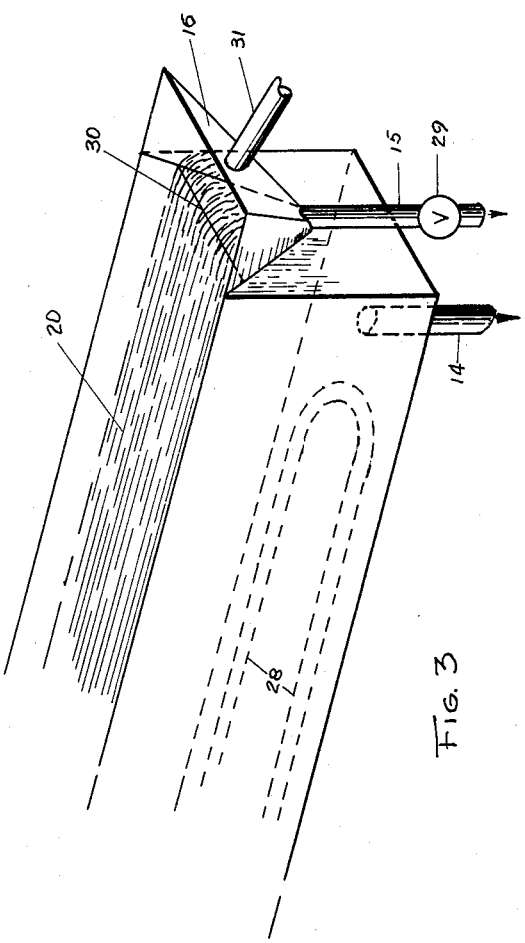

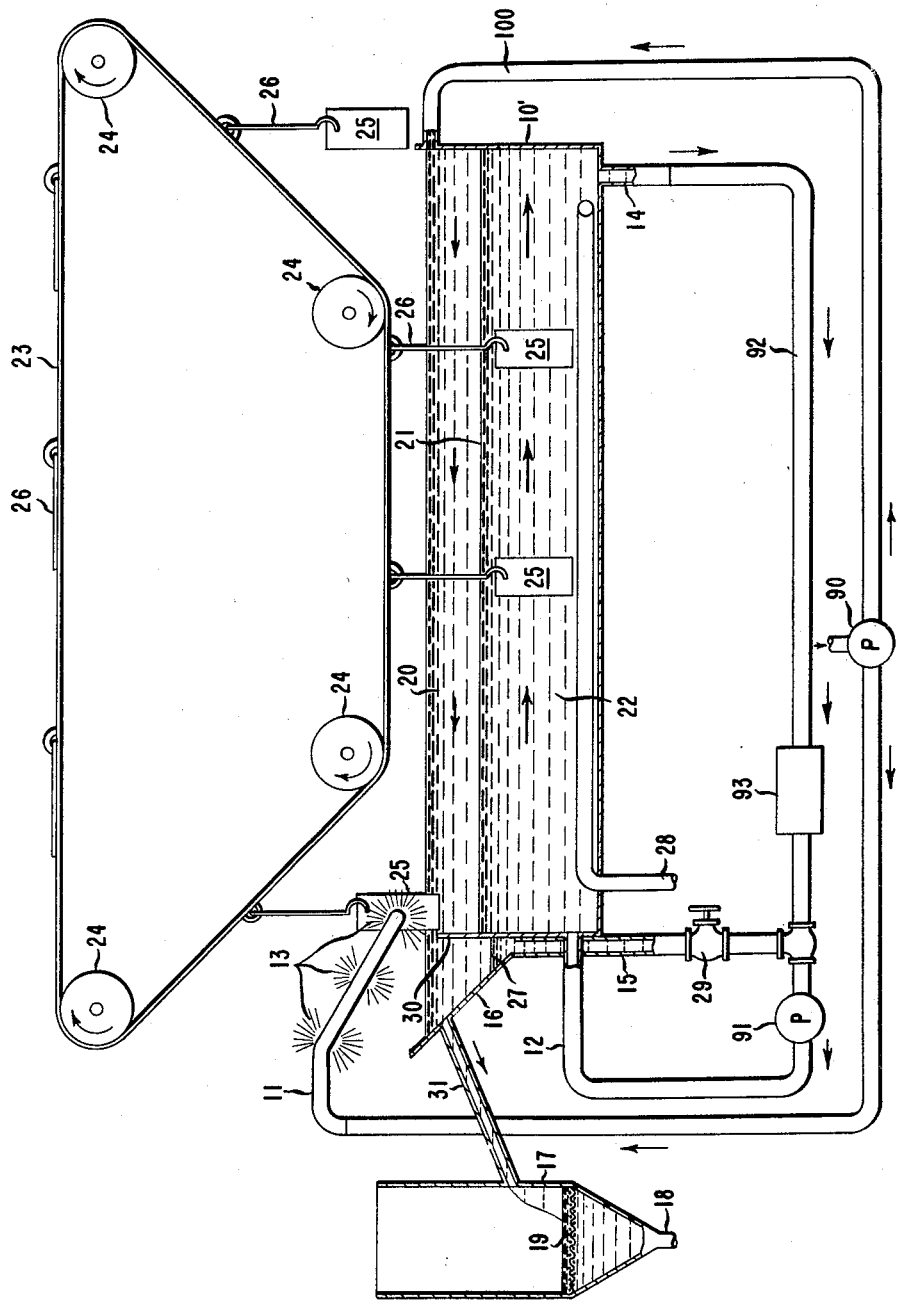

2,923,648

DI-PHASE CLEANING SYSTEM

Robert T. Kilburg, Niagara Falls, N.Y., assignor to E. I. du Pont de Nemours and Company, Wilmington, Del., a corporation of Delaware Application September 26, 1956, Serial No. 612,312

7 Claims. (Cl. 134—12)

This invention relates to a method for cleaning of non-porous, surface contaminated articles to remove various types of soil including materials that are soluble or dispersible in both non-aqueous solvents and water. It relates particularly to a cleaning system utilizing chlorohydrocarbons and water.

In the past, liquid phase counter-current dip cleaning processes have been employed with chlorohydrocarbons as well as with aqueous cleaners. However, in many cleaning processes, satisfactory results cannot be obtained with either aqueous or non-aqueous solvents alone. Processes involving chlorohydrocarbon solvents at temperatures below their boiling point also tend to be expensive due to vaporization losses of solvent. Dispersions of solvents in water combined the cleaning action of aqueous and non-aqueous solvents but these also lead to high vaporization losses unless carried out in closed equipment. Furthermore, the simplicity inherent in the use of open tanks is lost with all types of closed treating tanks.

It is the general object of this invention to provide an effective, economical method for carrying out a continuous diphase cleaning process at ordinary temperatures or temperatures below the boiling point of the solvent-water azeotrope.

Another object is to provide a simple di-phase cleaning bath employing counter-current treatment of metal or other non-porous articles with both a chlorohydrocarbon solvent and water.

Another object is to provide apparatus for dip cleaning in a di-phase bath with means for complete removal or organic solvent from the cleaned articles as well as continuous removal of insoluble soils.

Other objects will become evident in the following discussion.

In general, the objects of this invention are accomplished by moving articles to be cleaned through a long rectangular bath consisting of a lower layer of a chlorinated hydrocarbon solvent flowing counter-current to the articles to be cleaned and an upper layer of water which may flow counter-current or co-current to the work. The upper water layer is fed continuously, at least in part, by an overhead fixed spray at the work exit where it flushes solvent and loose insoluble soil from the work. The water flows off continuously from a weir into a water separator and solvent trap from which it passes to a filter which removes any insoluble soil that is carried off in water suspension. The filtered water may be discharged to the drain or recirculated to the spray at the work exit. Solvent may be recirculated, at least in part or subjected to recovery by distillation before recycling.

Fig. 2 shows a horizontal view of the cleaning tank and filter.

Fig. 3 shows a perspective drawing of the end of the cleaning tank as seen from line 1 with the filter removed.

Figure 4 shows a vertical section of a modified cleaning system and schematically illustrates the separate purifying and recycling means.

Figure 1:
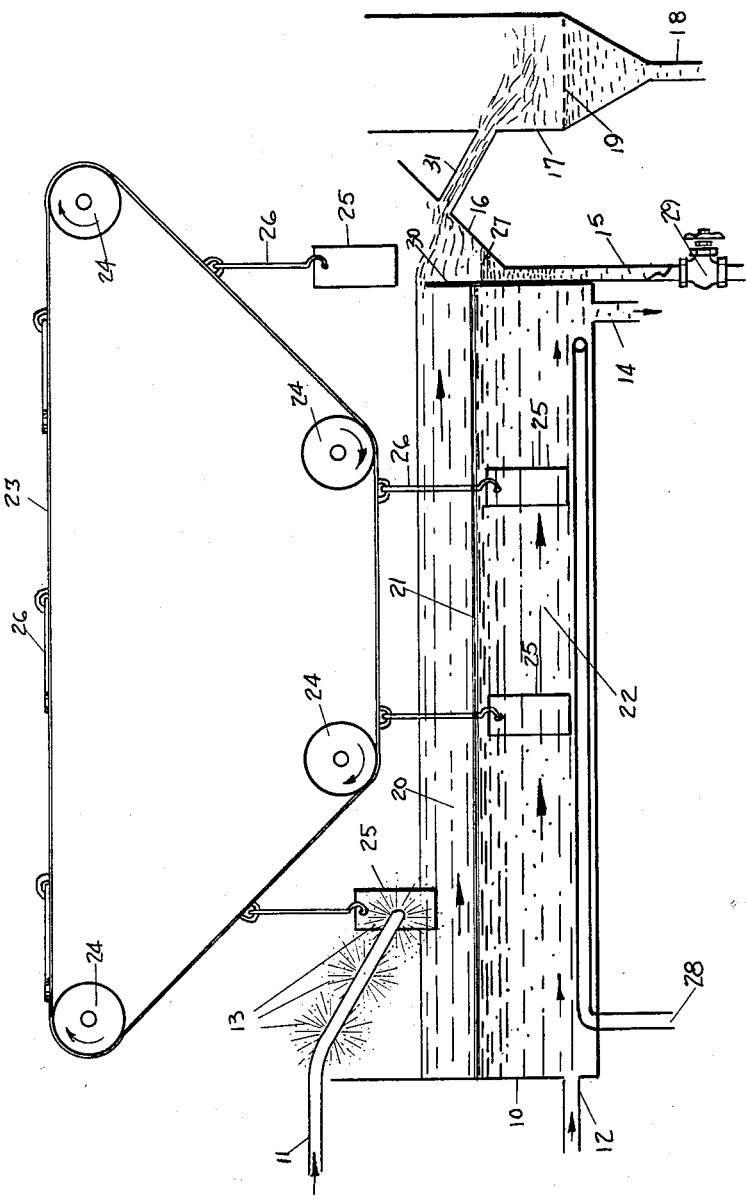
Fig. 1 shows a vertical section of the whole cleaning system taken on line 2 of Fig. 2.

These figures indicate a preferred embodiment of the process. However, they are illustrative only since various alternates will be readily discernible to anyone skilled in the art.

The vertical section in Fig. 1 shows the long rectangular cleaning tank 10 holding the di-phase bath consisting of lower solvent phase 22 and the upper water layer 20. A weir partition 30 allows the water phase to overflow into the separator and solvent trap 16 from which pipe 31 carries the water to the filter 17. The work is carried by an endless chain 23 by means of sprocket wheels 24. Hooks 26 support the work from the chain. This chain sprocket system for carrying the work is not shown in Figures 2 and 3.

Solvent enters the tank through pipe 12 and exits through pipe 14 moving counter-current to the work. At least a part of the solvent is purified by distillation before recycling through pipe 12. Water enters the tank through pipe 11 which divides as shown in Fig. 2 and is equipped with spray heads at positions 13. The water leaves the tank passing over weir 30 into water separator and solvent trap 16 from which any suspended solvent is removed through pipe 15 as the lower phase whose interface is shown at 27. Valve 29 controls the exit of the trapped solvent. Weir 30 is well above the solvent-water interface 21 in the cleaning tank. Suspended solid matter in the water phase is filtered off in filter 17 on screen 19. The filtered water then leaves through pipe 18 from whence it may be run to the drain or recirculated through pipe 11. Circulation pumps for the bath constituents are not shown but their use is obvious. The work is placed on the conveyor hooks 26 and enters the cleaning tank on the right side of Fig. 1 as shown. It passes through the water into the solvent re-emerging at the other end of the tank where it passes through the spray 13. It is then removed from the supporting hooks.

Heating coils 28 are used to warm the solvent if desired.

As will be evident to anyone skilled in the art tank 10 may be a simple narrow rectangular tank whose dimensions are determined by the size and shape of the work to be cleaned or it may be U-shaped so that the entrance and exit ends are parallel. Hooks may be replaced by other requisite supporting means including wire baskets for holding small items to be cleaned. Spray means may be arranged as desirable to clean solvent and solid loose soil from all sides of the work. If desired a circular spray pipe may curve around chain 23 with spray heads set at frequent intervals.

As cleaning liquid for the non-aqueous bottom phase in the cleaning tank, any chlorinated hydrocarbon degreasing solvent having a density substantially greater than that of water may be employed. However, our preferred solvents are trichlorethylene, methylene chloride and perchlorethylene. Mixtures of these solvents with hydrocarbon cleaning solvents, such as benzine, naphtha and the like, may also be used provided that the density of the solvent mixture is substantially greater than water (at least about 1.1) so that it will separate readily as a lower phase and not disperse appreciably in the aqueous phase during the cleaning process.

The water and solvent as shown proceed through the tank counter-current to the work. As a result, the work is not contaminated with dirty solvent but is subjected to progressively cleaner solvent as it passes through the bath. The water phase, if desired, however, may proceed co-current to the work. In this case, the water separation weir, trap and filter are located at the work exit or left hand (in the drawing) end of the tank. In this case, the work is sprayed with water as shown when it leaves the tank but only a portion of the water is fed into the spray pipe 11. The rest of the water is fed by a special pipe into the work entrance end of the tank. In this case, spray drippings may, if desired, fall directly into the solvent trap or filter.

Figure 4 illustrates the modification described above where the conveyor lowers workpieces into tank 10' into contact first with water layer 20 and then solvent layer 22 which flow co-current and countercurrent with the workpieces, respectively. Pipe 100 supplies water at the entrance of the tank and to spray pipe 11 positioned over solvent trap 16. Circulation pump 90, having a water inlet, provides the necessary water pressure.

Solvent flow is maintained by pump 91 which circulates the solvent countercurrent to the flow of the water layer. Trapped solvent is periodically admitted to pipe 92 through valve 29 and is circulated by pump 91.

A conventional regenerating and storage system 93 containing the usual filter and still is located between pipe 12 and exit pipe 14.

Heating of the tank contents may be employed but the temperature must never exceed the boiling point of the solvent-water azeotrope.

Having described my invention, I claim:

1. An apparatus for cleaning surface-contaminated, non-porous articles with a diphase bath consisting of a non-aqueous solvent having a density substantially greater than water and water, said apparatus comprising: (1) an elongated tank adapted to contain in the lower part a quantity of the said non-aqueous solvent of sufficient depth for complete immersion therein of the aforesaid articles and in the upper part a supernatant layer of water, said tank being provided with separate and distinct means for maintaining a continuous flow of fluid in both the lower and upper parts thereof, said means being adapted to remove the denser, non-aqueous solvent from one end of the lower part of the tank and addition thereof to the other end of the lower part of the tank and means adapted to remove the less dense water from one end of the upper part of the tank and addition thereof at the other end of the upper part of the tank and (2) means for dipping the aforesaid articles through the upper part of the tank into the lower part thereof, conveying them longitudinally through said lower part and removing them through the upper part of the tank.

2. The apparatus of claim 1 including spray means adapted to spray the articles with water as they leave the tank and add in this manner at least part of the water added to the upper portion of the tank.

3. The apparatus of claim 2 in which the means of removing water from the upper portion of the tank consists of a weir adapted to allow surface fluids to pass into a separate compartment comprising a filter and phase separator to permit removal of water and solids from the denser non-aqueous solvent entrained therein.

4. The apparatus of claim 2 including means for separately purifying and recycling, at least in part, the fluid from the lower part of the tank.

5. A continuous process for cleaning surface-contaminated, non-porous articles which comprises: (1) providing a di-phase bath consisting of a lower solvent phase having a density substantially greater than water and an upper water phase, the temperature of said di-phase bath being not greater than the boiling point of the water-solvent azetrope, (2) successively dipping said articles through said water-phase into said solvent phase, conveying them longitudinally through said solvent phase in one direction and removing them through said water phase so that soil soluble and dispersible in both phases will be removed and (3) maintaining constant, distinct and separate flows of the fluids constituting the upper and lower phases, the flow of the lower phase being counter-current to the longitudinal movement of the aforesaid articles through the bath.

6. The process of claim 5 in which the removal of insoluble soil is completed by spraying the articles with water as they leave the bath while adding in this manner at least part of the water added to the upper portion of the tank to maintain the flow of this phase.

7. The process of claim 5 in which the lower phase is purified and recycled, at least in part, and the upper water phase is continuously separated from solvent and solids suspended or entrained therein.

References Cited in the file of this patent

UNITED STATES PATENTS

| | | |
|---|---|---|
| 1,311,496 | Castellini | July 29, 1919 |
| 1,329,467 | Miskella | Feb. 3, 1920 |
| 2,153,577 | Levine | Apr. 11, 1939 |
| 2,310,569 | Booth | Feb. 9, 1943 |
| 2,314,369 | Reed | Mar. 23, 1943 |